F. REICH.
PISTON RING HOLDER.
APPLICATION FILED MAY 6, 1920.

1,368,655.

Patented Feb. 15, 1921.

Inventor
Frederick Reich
By his Attorney

UNITED STATES PATENT OFFICE.

FREDERICK REICH, OF ELIZABETH, NEW JERSEY.

PISTON-RING HOLDER.

1,368,655.

Specification of Letters Patent.   Patented Feb. 15, 1921.

Application filed May 6, 1920.   Serial No. 379,249.

*To all whom it may concern:*

Be it known that I, FREDERICK REICH, a citizen of the United States, and a resident of the city of Elizabeth, in the county of Union, State of New Jersey, have invented certain new and useful Improvements in Piston-Ring Holders, of which the following is a specification.

The improvements relate to devices adapted and intended to be used in connection with the work of applying piston rings to the pistons of internal combustion engines, and placing the pistons with the rings thereon in their cylinders, and among the objects of the improvements are the provision of a device for compressing and holding the piston rings on the piston and protecting them while the piston is being inserted in the cylinder.

In the usual construction of internal combustion engines the piston rings are compressible and are seated in circumferential grooves in the piston, and when the piston is placed in the cylinder care must be taken to avoid injury to the rings, which project beyond the outer surface of the piston and are likely to be injured or displaced in this operation. The conditions existing in the ordinary garage or shop where the work of placing or replacing piston rings and assembling motor parts is carried on are such that any tool or appliance which is not made of heavy metal, not easily broken, is likely to become damaged, and such tools and appliances are very frequently lost or stolen. The functions of a piston ring holder and protector are such that it must needs be made of light metal having cylindrical form, so that it is very easily damaged; and when so damaged its usefulness is impaired or destroyed. An expensive article of this kind is also very apt to be borrowed and not returned, or stolen. Again pistons vary greatly in size, and unless a holder with a more or less unsatisfactory adjustment is used, separate holders must be used for each size. It is therefore among the objects of the present improvements to provide a holder and protector of extremely simple, cheap, and at the same time effective construction, which can be made at a relatively small cost and in various sizes, and which can be quickly applied to and removed from any piston without the use of tools and which when so used will answer all the requirements of such a device.

Figure 1:
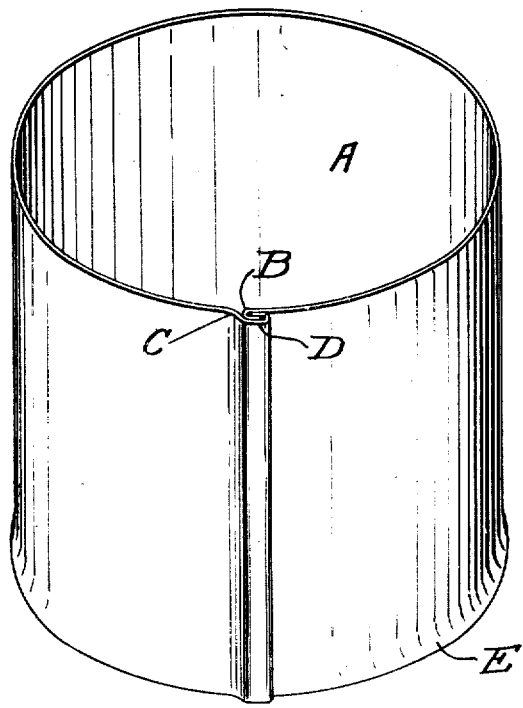
Figure 2:
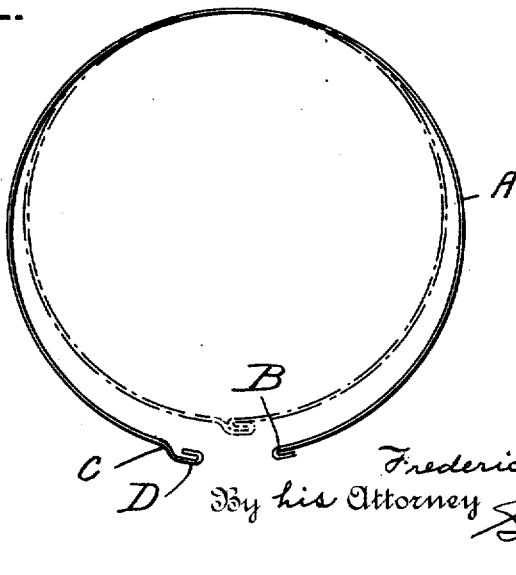

The improvements are illustrated in the accompanying drawing, in which Figure 1 is a perspective view of a piston ring holder embodying the improvements, and Fig. 2 a plan thereof.

The cylinder A is made of relatively thin spring metal so that it may be opened and closed and expanded to a considerable extent without losing its true cylindrical shape, so that it will fit the piston accurately and may at the same time be opened sufficiently to place it in position on the piston. The edges of the sheet metal forming the cylinder are turned to form an interlocking openable seam, the metal at one edge being formed into a hook B, and the metal at the other edge being first offset as shown at C and then formed into a complemental hook D.

The lower edge E of the cylinder is turned outwardly so that when it is passed over the piston it will not catch in the rings and displace or injure them in any way.

In operation the piston rings are first placed in their seating grooves in the piston, and the cylinder A is then passed thereover after its edges have been locked. This may be done by simply compressing the cylinder until the hooked edges B and D pass each other, when the resiliency of the metal will cause them to interlock and hold firmly, on releasing the pressure. The piston may then be inserted in its cylinder, and in this operation the fact that the upper edge of the collar A is smooth and unobstructed permits it to enter the bottom of the cylinder bore, which is usually slightly flared at this point, thus preventing the piston from sliding into its cylinder, and out of the holder, without danger that the rings will be bent, displaced or injured in any way.

It will be apparent that the holder above described is of simple, strong and durable construction, and that it may be made in different sizes, so that it will fit accurately any size of cylinder, at a small expense. It will also be seen that it has no projecting or adjustable parts to interfere with the careful and proper manipulation of the piston or catch in any other part of the engine. These features of construction increase the life and usefulness of the device and enable the operator to work quickly and accurately.

The cylinder A is preferably so formed that when closed it will form a true circle, but will spring open when the locking vertical edges are released, so that the device when open will be of greater diameter than the piston and its rings. To close it therefore it is only necessary to compress it until the locking edges overlap and then release it, and to open it a slight compression, sufficient to release these edges from engagement and a slight inward pressure near one edge to bring them out of alinement only is necessary. After this is done the cylinder is released and springs open of its own accord.

One of the advantages of the present device is due to the absence of handles, clamps, adjusting means or other loose or projecting parts. This enables the user to insert the piston with the ring protector and the holder into the bottom of the cylinder, where the nature of the construction is such that a holder with such parts could not be used. After the piston has been passed into the cylinder, the holder is moved down over the rod and crank shaft connection—which is usually larger than the piston—the opening of the cylinder A permitting it to pass over these parts.

What I claim is:

1. A device of the character described, comprising a cylinder of spring metal formed of a piece of sheet metal bent into cylindrical shape and having its longitudinal edges disconnected and normally separated, the said cylinder being so formed that when its edges are brought into coincidence it forms a cylinder of circular cross-section, the said longitudinal edges being turned over on opposite sides to form locking hooks adapted to engage each other to hold the cylinder in closed position, and being held in locking engagement by the tendency of the cylinder to expand, one of the said turned over edges being provided with an offset at the point where the turned over portion joins the wall of the cylinder.

2. A device of the character described, comprising a cylinder of spring metal formed of a piece of sheet metal bent into cylindrical shape and having its longitudinal edges disconnected and normally separated, the said cylinder being so formed that when its edges are brought into coincidence it forms a cylinder of circular cross-section, one of the ends of said cylinder being turned outwardly near the edge thereof to form a flaring portion having a gradually increasing diameter.

3. A device for compressing piston rings while seated in the piston of an internal combustion engine, and holding and protecting them while the piston is being inserted in its cylinder, comprising a piece of spring sheet metal bent into the form of a cylinder with a longitudinal opening and so formed that when the edges of the opening are brought together a closed cylinder of circular cross-section is formed, the said device being normally open and the spring action of the metal tending constantly to return it to that position.

4. A device for compressing piston rings while seated in the piston of an internal combustion engine, and holding and protecting them while the piston is being inserted in its cylinder, comprising a piece of spring sheet metal bent into the form of a cylinder with a longitudinal opening and so formed that when the edges of the opening are brought together a closed cylinder of circular cross-section is formed, the exterior of the said cylinder being smooth and unobstructed at its upper end and capable of being inserted into the mouth of the engine cylinder with the piston.

Witness my hand this 16th day of March, 1920, at the city of New York, in the county and State of New York.

FREDERICK REICH.